United States Patent
Silva

(10) Patent No.: US 9,394,026 B2
(45) Date of Patent: Jul. 19, 2016

(54) STEP-THROUGH BICYCLE FRAME

(71) Applicant: 3G Bikes, LLC, Whittier, CA (US)

(72) Inventor: Gary Silva, El Segundo, CA (US)

(73) Assignee: 3G Bikes, LLC, Whittier, CA (US)

( * ) Notice: Subject to any disclaimer, the term of this patent is extended or adjusted under 35 U.S.C. 154(b) by 0 days.

(21) Appl. No.: 14/320,293

(22) Filed: Jun. 30, 2014

(65) Prior Publication Data
US 2015/0001828 A1     Jan. 1, 2015

Related U.S. Application Data
(60) Provisional application No. 61/841,747, filed on Jul. 1, 2013.

(51) Int. Cl.
*B62K 3/06* (2006.01)

(52) U.S. Cl.
CPC .................................. *B62K 3/06* (2013.01)

(58) Field of Classification Search
CPC .......... B62K 3/06; B62K 19/00; B62K 19/16; B62K 15/00
See application file for complete search history.

(56) References Cited

U.S. PATENT DOCUMENTS

| | | | | |
|---|---|---|---|---|
| 688,419 A * | 12/1901 | Keating | ............... | B62K 19/16 280/281.1 |
| 1,584,646 A * | 5/1926 | Radnall | ............... | B62K 3/10 280/261 |
| 1,597,195 A * | 8/1926 | Heym | ............... | B62K 3/10 280/261 |
| 2,495,859 A * | 1/1950 | Mennesson | ............... | B62K 3/06 280/261 |
| 4,460,057 A * | 7/1984 | Kohyama | ............... | B62K 5/027 180/210 |
| 4,520,891 A * | 6/1985 | Omholt | ............... | B62K 11/04 180/219 |
| 4,662,467 A * | 5/1987 | Arai | ............... | B60G 3/24 180/210 |
| 4,730,840 A * | 3/1988 | Goldmeier | ............... | B62H 1/12 280/210 |
| 5,725,225 A * | 3/1998 | Lai | ............... | B62K 25/30 280/275 |
| 6,012,733 A * | 1/2000 | Rafoth | ............... | B62K 3/00 280/281.1 |
| 6,149,176 A * | 11/2000 | Fujii | ............... | B62K 25/30 192/209 |
| 7,144,027 B2 * | 12/2006 | Kitamura | ............... | B62M 25/045 280/259 |
| 7,862,064 B2 * | 1/2011 | Camasmie | ............... | B62K 3/005 280/278 |
| 8,152,189 B2 * | 4/2012 | Dodman | ............... | B62K 3/10 280/261 |
| 8,382,135 B1 * | 2/2013 | Raike, III | ............... | B62M 29/00 152/209.11 |
| 8,757,312 B2 * | 6/2014 | Maruyama | ............... | B62K 11/02 180/219 |
| 2002/0148666 A1* | 10/2002 | Simons | ............... | B62M 6/60 180/228 |
| 2003/0127822 A1* | 7/2003 | Fleck | ............... | B62M 1/36 280/259 |
| 2005/0000756 A1* | 1/2005 | Biria | ............... | B60T 8/261 188/26 |
| 2011/0278816 A1* | 11/2011 | Chamberlain | ............... | B21C 37/29 280/281.1 |
| 2012/0061941 A1* | 3/2012 | Choi | ............... | B62K 3/02 280/281.1 |
| 2013/0249188 A1* | 9/2013 | Beale | ............... | B62K 19/00 280/284 |
| 2014/0197616 A1* | 7/2014 | Raike, III | ............... | B62K 17/00 280/259 |
| 2015/0076789 A1* | 3/2015 | Singh | ............... | B62K 3/08 280/281.1 |

* cited by examiner

*Primary Examiner* — Joseph Rocca
*Assistant Examiner* — Gabriela C Craciun
(74) *Attorney, Agent, or Firm* — Knobbe, Martens, Olson & Bear, LLP

(57) ABSTRACT

A bicycle having a bicycle frame comprising a head tube, a top tube, a down tube, a bottom bracket and at least one chain stay. A single, tubular member has a first portion that forms the top tube and extends downwardly from the head tube toward the bottom bracket and a unitary second portion that extends upwardly from the bottom bracket to form the seat tube. A plurality of struts extends between the tubular member and the down tube, bottom bracket or at least one chain stay. In some arrangements, the down tube and the at least one chain stay are the only frame members that contact the bottom bracket. In some arrangements, the top tube contacts the down tube at an intermediate portion thereof.

10 Claims, 7 Drawing Sheets

STEP-THROUGH BICYCLE FRAME

BACKGROUND OF THE INVENTION

1. Field

The present invention relates generally to bicycle frames and, in particular, to a step-through style bicycle frame having a curved and/or downwardly-extending top tube.

2. Description of the Related Art

Many types and styles of bicycles frames exist, including step-through style bicycle frames having a downwardly-extending top tube, which provides increased stand-over clearance. Despite the existence of such bicycle frames, a need still exists for new bicycle and bicycle frame designs providing advantages over the prior designs and/or providing the public with a useful choice.

SUMMARY

The systems, methods and devices described herein have innovative aspects, no single one of which is indispensable or solely responsible for their desirable attributes. Without limiting the scope of the claims, some of the advantageous features will now be summarized.

A bicycle or bicycle frame has a head tube, a top tube, a down tube, a bottom bracket and at least one chain stay. The top tube extends downwardly from the head tube toward the down tube. Preferably, the top tube contacts the down tube at an intermediate portion thereof. In some arrangements, the top tube is secured to the down tube where they contact one another, such as by a welded joint, for example. In some configurations, the top tube contacts the down tube generally at the center point of the down tube. The top tube preferably contacts the down tube at a point or along a relatively short length (e.g., less than 3-4 inches or about 2 inches).

In some configurations, a rearward end of the top tube curves upwardly to form a seat tube, which can support a seat or saddle directly or through an intermediate structure, such as a seat post. One or more struts can be provided to support the top/seat tube relative to another portion of the bicycle frame. For example, a strut can extend between the top/seat tube and the bottom bracket and/or a strut can extend between the top/seat tube and the at least one chain stay. One or more struts can be provided on each side of the frame. For example, one strut can extend from the top/seat tube to one side of the bottom bracket or one chain stay and another strut can extend from the top/seat tube to the other side of the bottom bracket or to the other chain stay (assuming two chain stays are present). The struts can contact the top/seat tube at a transition between the top tube portion and the seat tube portion, which can be a curved section of the tube.

A bicycle or bicycle frame has a head tube, a bottom bracket configured to support a pedal crank assembly, a down tube extending between the head tube and the bottom bracket and at least one chain stay extending in from the bottom bracket in a direction generally opposite the down tube. A single, tubular member has a first portion that forms a top tube and extends downwardly from the head tube toward the bottom bracket and a unitary second portion that extends upwardly from the bottom bracket to form a seat tube. A plurality of struts extends between the tubular member and the bottom bracket or at least one chain stay. The top tube contacts the down tube at a location between, and spaced from each of, the head tube and the bottom bracket.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION OF THE PREFERRED EMBODIMENTS

Figure 1:
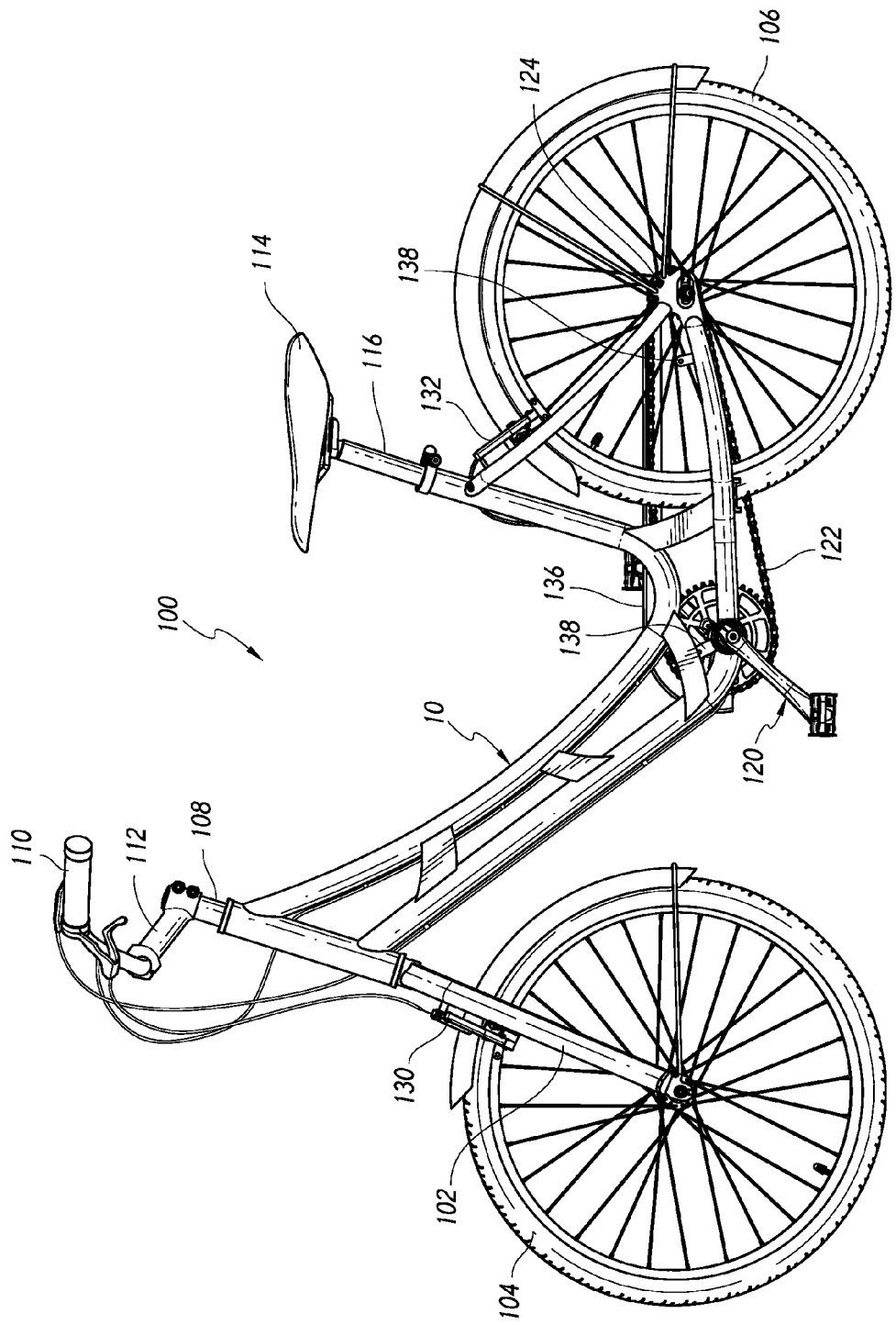
FIG. 1 is a side view of a bicycle having a bicycle frame, which has certain features, aspects and advantages of the preferred embodiments.

Embodiments of the bicycle, bicycle frame, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 illustrates a bicycle 100 having a bicycle frame 10. A front fork 102 is supported by the frame 10 for rotation about a steering axis. A front wheel 104 is coupled to a lower end of the front fork 102 for rotation relative to the fork 102 and to be steered (or rotated about the steering axis) along with the fork 102. A rear wheel 106 is supported by a rear portion of the frame 10 for rotation relative to the frame 10. The fork 102 includes a steerer tube 108 that extends through the frame 10 and an upper portion of which supports a handlebar 110 via a stem 112. The stem 112 can be angularly adjustable with respect to the steerer tube 108 or can be fixed, as shown. A seat or saddle 114 is supported relative to the frame 10 by a seatpost 116. The seatpost 116 can be slid into or out of the frame 10 to permit adjustment of a height of the seat 114.

The bicycle 100 includes a drivetrain comprising a pedal crank assembly 120 supported for rotation relative to the frame 10. The pedal crank assembly 120 is coupled to one or both of the wheels 104, 106 by a suitable arrangement, such as an endless loop (e.g., chain or belt) or another suitable arrangement (e.g., drive shaft). In the illustrated arrangement, the rear wheel 106 is coupled to the pedal crank assembly 120 by a chain 122. The rear wheel 106 can include a hub 124 that carries one or more sprockets that can be driven by the chain 122. The hub 124 can also include a one-way clutch arrangement, which allows the rear wheel 106 to rotate while the chain 122 is stationary. In other words, the bicycle 100 is capable of coasting with the pedal crank assembly 120 stationary while the wheels 104, 106 rotate or the rear wheel 106 can rotate faster than the speed that it is driven by the pedal crank assembly 120. The drivetrain can be a single gear or multi-geared, such as utilizing derailleur system with multiple chainrings and/or cogs or an internal hub transmission.

The bicycle 100 can include a brake system, such as one or both of a front brake 130 and a rear brake 132. The illustrated brakes 130, 132 are rim caliper brakes; however, other suitable brake types can be employed. For example, one or both of the wheels 104, 106 can include disc brakes having a rotor attached to the wheel and a brake caliper attached to the frame/fork and capable of applying a braking force to the rotor. A coaster-style brake could also be employed, which is configured to brake the rear wheel 106 in response to backwards pedaling of the pedal crank assembly 120. Other suitable brake arrangements (e.g., drum brakes) could also be employed. The transmission and/or brakes can be controlled by well-known user controls (levers, buttons, twist assemblies, etc.) located on the handlebar 110, for example. The illustrated bicycle 100 includes a chain guard 136, which can be supported by tabs 138 on the frame 10.

The illustrated bicycle frame 10 can be constructed from any suitable material, such as aluminum, steel, titanium or carbon fiber, for example. The frame 10 has a head tube 12, a top tube portion (top tube) 14, a down tube portion (down tube) 16, a bottom bracket shell (bottom bracket) 18 and at least one chain stay 20. The bottom bracket 18 is configured to support the pedal crank assembly 120. The top tube 14 extends downwardly from the head tube 14, preferably toward the down tube 16. In some configurations, a rearward or lower end of the top tube 14 curves upwardly to form a seat tube portion (seat tube) 24, which can support the seat or saddle 114 directly or through an intermediate structure, such as the seatpost 116. That is, the top tube 14 and seat tube 24 can be constructed from a single curved or bent tube.

One or more struts 26 can be provided to support the top tube 14 and seat tube 24 relative to another portion of the bicycle frame 10. For example, one or more struts 26 can extend between the top tube 14 or seat tube 24 and the down tube 16 and/or the at least one chain stay 20. In some configurations, one or more struts 26 can be provided on each side of the frame 10. In the illustrated arrangement, the struts 26 are provided in pairs with one strut 26 on one side of a central, longitudinal plane of the frame 10 and a matching strut 26 on the other side of the central, longitudinal plane. Preferably, the individual struts 26 of a strut pair are positioned symmetrically relative to the central, longitudinal plane. Preferably, the individual struts 26 of a strut pair are spaced from one another in a lateral direction and from the central, longitudinal plane. As a result, the struts 26 can define a central space therebetween, which can align with a central portion of the frame tubes (e.g., tubes 14, 16, 24) and provide convenient space to accommodate, for example, cables.

The struts 26 can be positioned in multiple locations to provide a desired amount of support to the top tube 14 and seat tube 24. For example, one pair of struts 26 can extend from the top tube 14 and/or seat tube 24 to a location on the down tube 16 that is forward of the bottom bracket 18. In other words, the struts 26 do not connect to or otherwise touch the bottom bracket 18. The struts 26 can be coupled to a location on the down tube 16 that is spaced forward of the bottom bracket 18. The struts 26 can contact the top tube 14 or seat tube 24 at or near a transition 28 between the top tube 14 and the seat tube 24, which can be a curved section of the tube. Thus, the struts 26 can extend from a location forward of the bottom bracket 18 or axis of the pedal crank assembly 120 (pedal crank axis) to a located rearward of the bottom bracket 18 or the pedal crank axis. In addition, because the top tube 14 and seat tube 24 are formed from a single tube and is spaced above the bottom bracket 18, the seat tube does not extend toward and does not contact the bottom bracket 18. In the illustrated arrangement, only the down tube 16 and the chain stays 20 contact the bottom bracket 18.

One or more additional struts 26 or strut pairs can be positioned between the top tube 14 or seat tube 24 and the down tube 16. For example, two additional pairs of struts 26 can be positioned between the top tube 14 and the down tube 16 between the head tube 12 and the strut pair 26 near the bottom bracket 18. The additional strut pairs 26 can be positioned on either side of an intermediate portion of the top tube 14 or a portion of the top tube 14 that is closest to the down tube 16.

One or more struts 26 can also be positioned between the top tube 14 or seat tube 24 and the at least one chain stay. In some configurations, two chain stays 20 are provided on each side of the frame 10, such as to straddle the rear wheel 106. Thus, a strut pair 26 can extend between the top tube 14 or seat tube 24 and the chain stays 20. As described above, the struts 26 can be spaced from one another and the central, longitudinal plane in a lateral direction with one strut 26 fixed to one chain stay and the other strut 26 fixed to the other chain stay. The struts 26 can contact the top tube 14 or seat tube 24 at or near a transition 28 between the top tube 14 and the seat tube 24, which can be a curved section of the tube.

The struts 26 can be of any suitable construction, such as a tubular member, for example. However, in the illustrated configurations, the struts 26 are in the form of plates. The plates can be cut from a flat piece of suitable material, such as aluminum, steel or titanium, for example. The plates can be relatively flat, as shown, along the central, longitudinal plane of the frame 10 or can be curved or bent. The plates can be relatively linear in shape in side view, or can be curved, as shown. More complex curved shapes could also be used.

The frame 10 can also include one or more seat stays 30 extending between the rearward end portions of the chain stay 20 and the seat tube 24. In the illustrated arrangement, a pair of seat stays 30 is provided. Each seat stay 30 extends from a respective one of the chain stays 20 to the seat tube 24. Thus, the chain stays 20 and the seat stays 30 straddle the rear wheel 106. The seat stays 30 can be curved or straight. In the illustrated arrangement, the seat stays 30 include a downward or inward curve.

Figure 2:
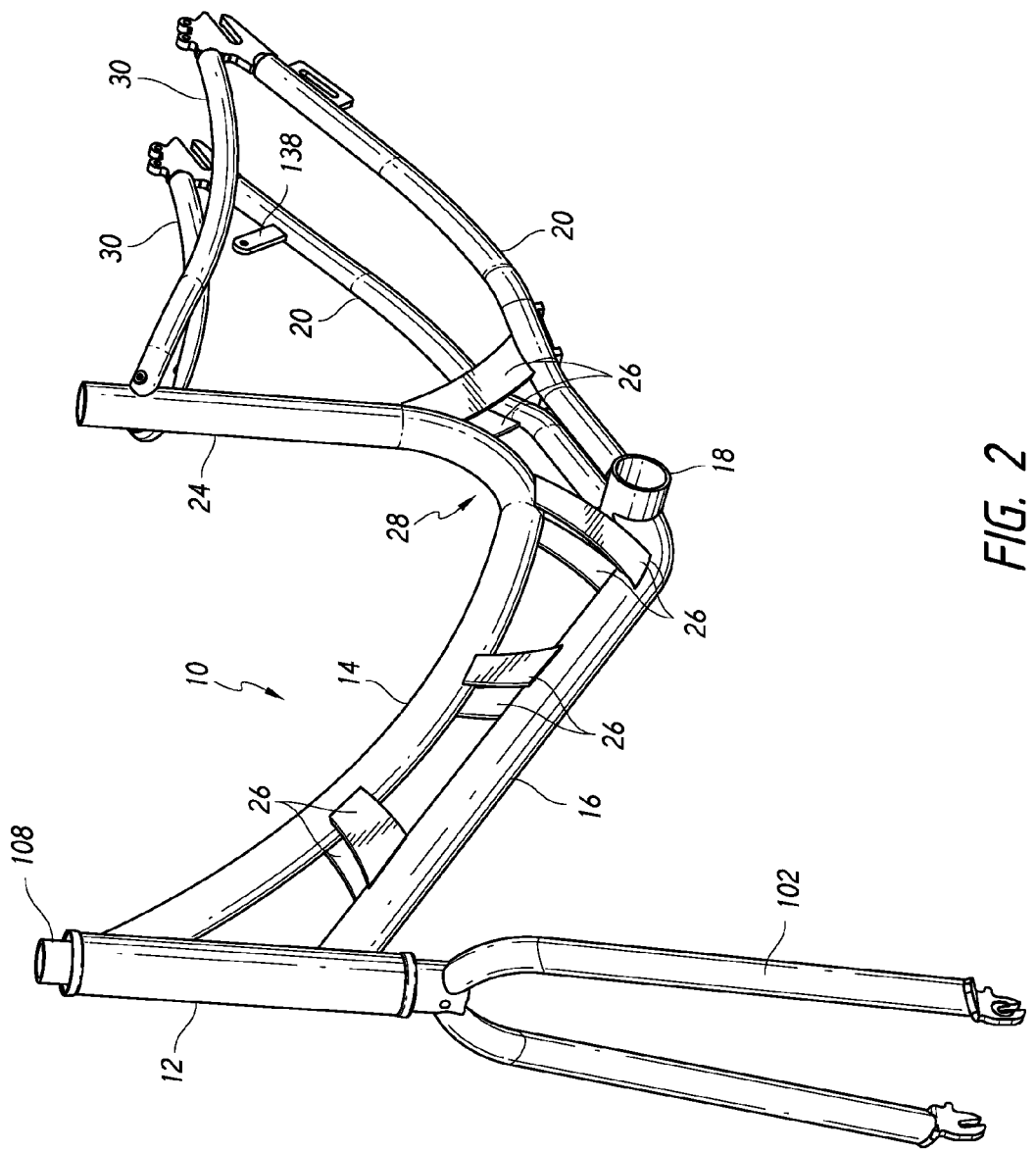
FIG. 2 is a perspective view of the bicycle frame of FIG. 1 with the other components of the bicycle removed.
Figure 3:
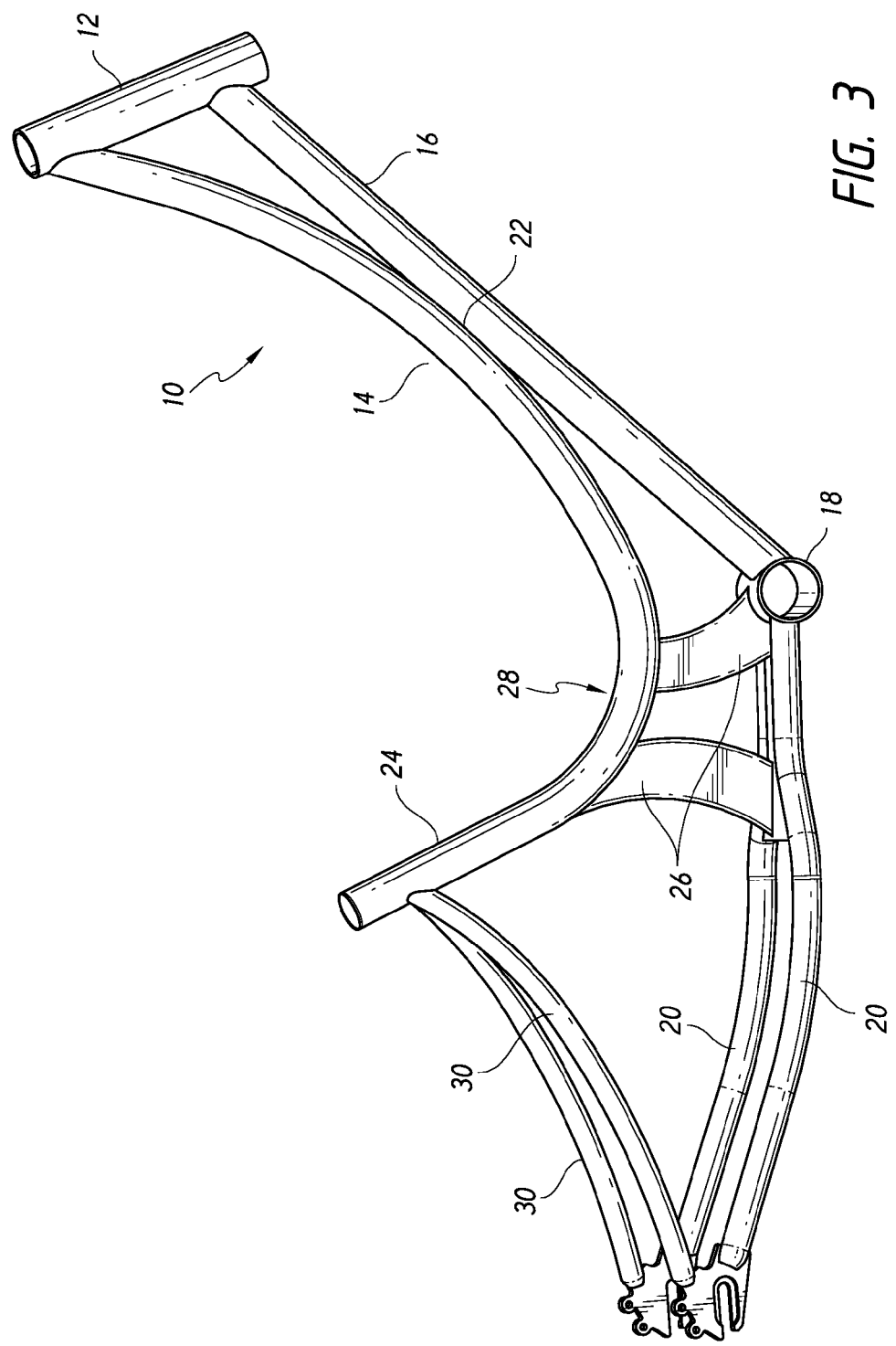
FIG. 3 is a side view of another bicycle frame having certain features, aspects and advantages of the preferred embodiments.
Figure 4:
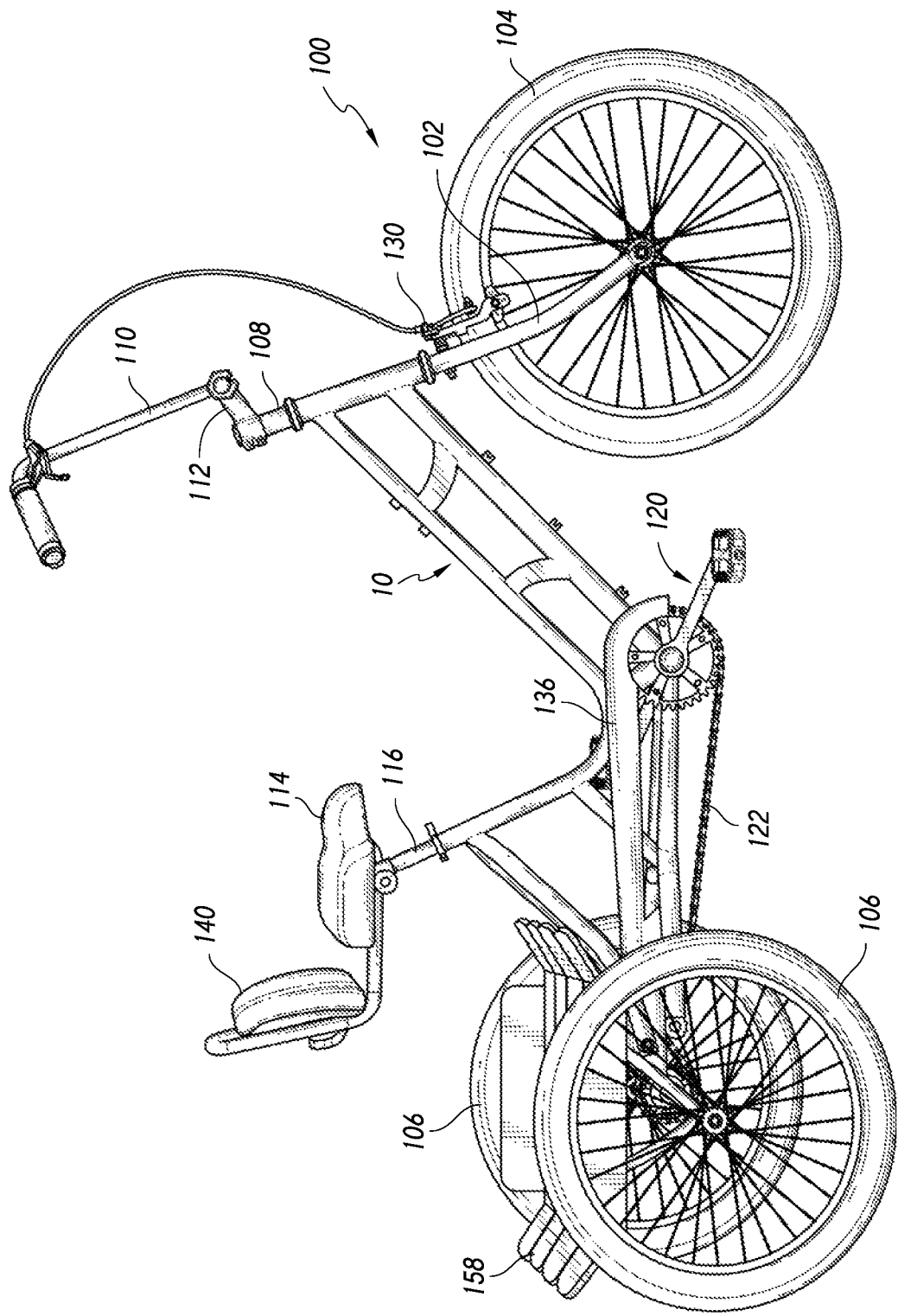
FIG. 4 is a side view of a 3-wheeled bicycle incorporating a bicycle frame having certain features, aspects and advantages of the preferred embodiments.
Figure 5:
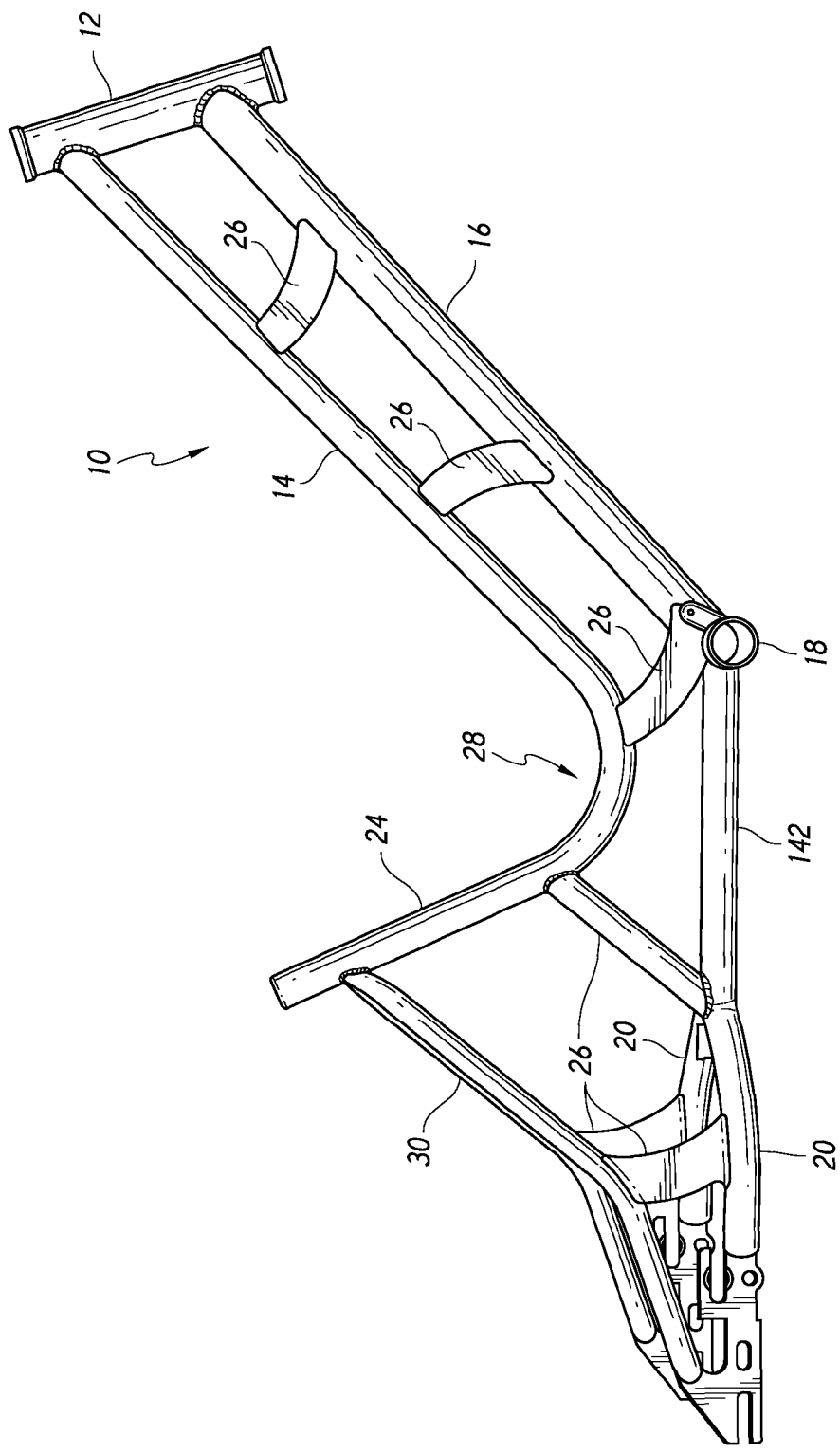
FIG. 5 is a side view of the bicycle frame of FIG. 4 with the other components of the bicycle removed.

FIG. 3 illustrates an alternative bicycle frame 10, which can be substantially similar to the bicycle frame 10 of FIGS. 1 and 2. Thus, the frame 10 of FIG. 3 is described in the context of the differences relative to the frame 10 of FIGS. 1 and 2. Features that are not described can be assumed to be the same as or similar to the corresponding features of the frame 10 of FIGS. 1 and 2, or can be of another suitable arrangement. The frame 10 of FIG. 3 has a head tube 12, a top tube 14, a down tube 16, a bottom bracket 18, at least one chain stay 20 (e.g., a pair of chain stays 20) and at least one seat stay 30 (e.g., a pair of seat stays 30). The top tube 14 extends downwardly from the head tube 12 toward the down tube 16. Preferably, the top tube 14 contacts the down tube 16 at an intermediate portion thereof. In some arrangements, the top tube 14 is secured to the down tube 16 where they contact one another, such as by a welded joint 22, for example. In some configurations, the top tube 14 contacts the down tube 16 generally at the center point of the down tube 16. The top tube 14 preferably contacts the down tube 16 at a point or along a relatively short length (e.g., about or less than about 3-4 inches or about or less than about 2 inches). The length of contact of the joint 22 can be less than about ⅕, less than about ⅛, less than about 1/10 or less than about 1/12 of a length of the top tube 14 or down tube 16.

In some configurations, a rearward end of the top tube 14 curves upwardly to form a seat tube 24, which can support a seat or saddle directly or through an intermediate structure, such as a seat post. One or more struts 26 can be provided to support the top/seat tube relative to another portion of the bicycle frame. For example, a strut 26 can extend between the top tube 14 or seat tube 24 and the bottom bracket 18 and/or a strut 26 can extend between the top tube 14 or seat tube 24 and the at least one chain stay 20. One or more struts 26 can be provided on each side of the frame 10. For example, one strut 26 can extend from the top tube 14 or seat tube 24 to one side of the bottom bracket 18 or one chain stay 20 and another strut 26 can extend from the top tube 14 or seat tube 24 to the other side of the bottom bracket 18 or to the other chain stay 20 (assuming two chain stays 20 are present). The struts 26 can contact the top tube 14 or seat tube 24 at a transition 28 between the top tube portion 14 and the seat tube portion 24, which can be a curved section of the tube.

FIGS. 4-7 illustrates an alternative cycle 100 that is of a 3-wheeled configuration. The cycle 100 and the frame 10 can be substantially similar to the bicycle 100 and the bicycle frame 10 of FIGS. 1 and 2 or the bicycle frame 10 of FIG. 3. Thus, the cycle 100 of FIGS. 4-7 is described in the context of the differences relative to the prior bicycle 100 and frame 10 of FIGS. 1-3. Features that are not described can be assumed to be the same as or similar to the corresponding features of the bicycle 100 or frame 10 of FIGS. 1-3, or can be of another suitable arrangement.

As described, the cycle 100 of FIGS. 4-7 includes two rear wheels 106 spaced apart from one another on either side of the central, longitudinal plane of the cycle 100. The seat 114 can include a back rest 140. The handlebar 110 can be taller than the handlebar of the prior bicycles 100. The chain stays 20 can be coupled to the bottom bracket 18 by an extension 142, which can be a single tubular member. The frame 10 can include a single, tubular strut 26 between a lower end of the seat tube 24 the extension 142 or chain stays 20. Additional struts 26 can be provided between the seat stays 30 and the chain stays 20 rearward of the single, tubular strut 26.

Figure 6:
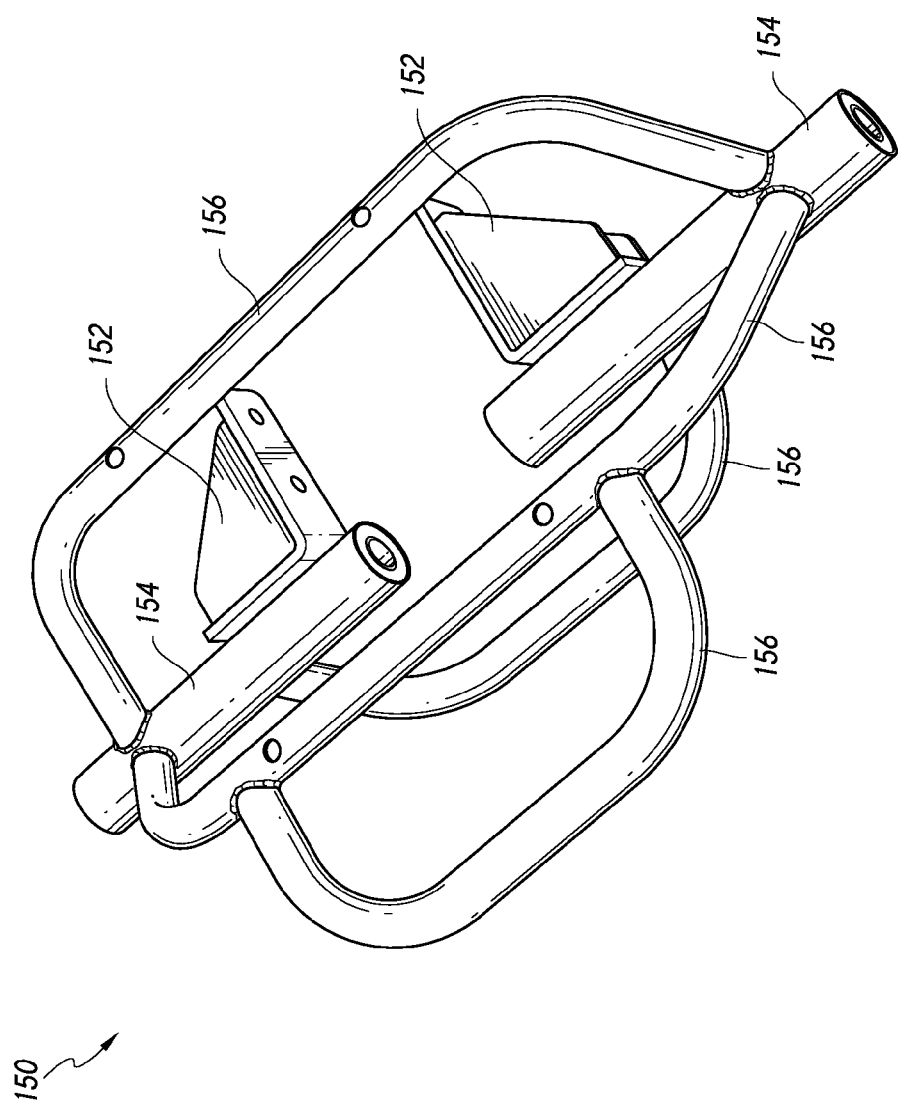
FIG. 6 is a perspective view of a rear axle support arrangement of the bicycle frame of FIG. 5.
Figure 7:
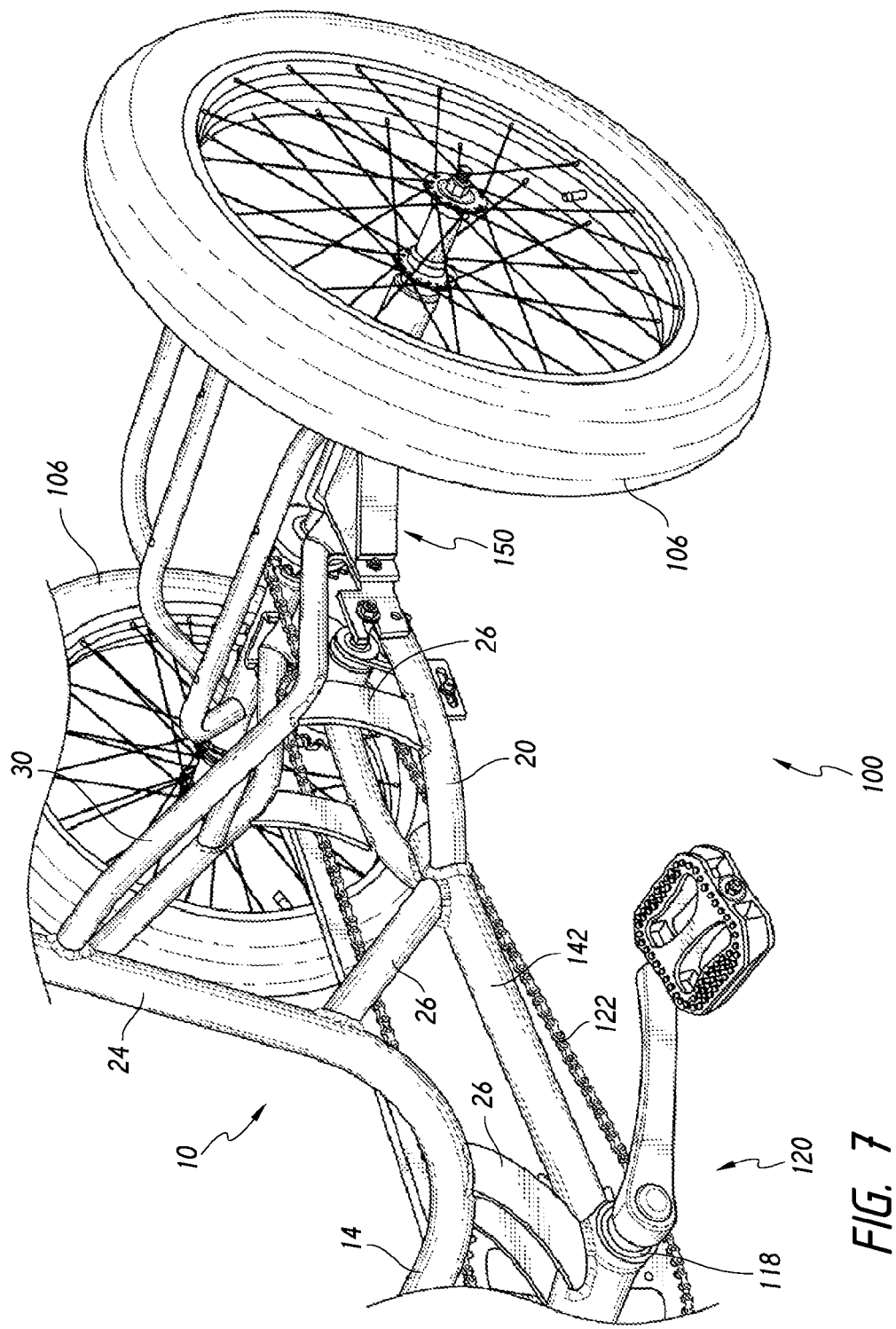
FIG. 7 is a perspective view of the rear portion of the 3-wheeled bicycle of FIG. 4.

FIG. 6 illustrates a rear axle assembly 150 that is coupled to the frame 10 and supports a rear axle and spaces the rear wheels 106. The rear axle can be operably connected to the pedal crank assembly 120 by any suitable arrangement, such as by a multi-loop endless loop (e.g., chain or belt) transmission arrangement, as shown. The chain stays 20 can support a first axle to which the pedal crank assembly 120 is directly connected by a first endless loop drive. The chain stays 20, rear axle assembly 150 or both can support the rear axle, which supports the rear wheels 106 and is connected to the first axle by a second endless loop drive. In the illustrated arrangement, the chain stays 20 support both the first axle and the second axle, which supports the rear wheels 106 preferably at a location outward of the chain stays 20. Thus, the rear wheels 106 straddle the chain stays 20.

The rear axle assembly 150 includes brackets 152 that can be connected to the chain stays 20. The brackets 152 can be generally triangular, which can be comprised of an L-piece and one or more gussets that provide additional support to the L-piece. The brackets 152 support axle portions 154 that can be elongated members that provide support to the rear wheel axle. The axle portions 154 extend between the chain stays 20 and the rear wheels 106 and space the rear wheels 106 apart from one another. The rear axle assembly 150 can include additional frame members 156, which can, for example, support a deck 158.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A bicycle frame, comprising:
   a head tube;
   a bottom bracket configured to support a pedal crank assembly;
   a down tube extending between the head tube and the bottom bracket;
   at least one chain stay extending in from the bottom bracket in a direction generally opposite the down tube;
   a single, tubular member having a first portion that forms a top tube extending downwardly from the head tube toward the bottom bracket and a unitary second portion that extends upwardly from the bottom bracket to form a seat tube;
   a plurality of struts extending between the tubular member and the down tube and at least one chain stay, the plurality of struts affixing the tubular member to the down tube and affixing the tubular member to the at least one chain stay;
   wherein the down tube and the at least one chain stay are the only frame members that contact the bottom bracket.

2. The bicycle frame of claim 1, wherein a first one of the plurality of struts extends from a location on the down tube forward of the bottom bracket to a location on the tubular member vertically above or rearward of the bottom bracket.

3. The bicycle frame of claim 2, wherein a second one of the plurality of struts extends from the tubular member at a location on the seat tube to the at least one chain stay.

4. The bicycle frame of claim 3, wherein the portions of the first one and the second one of the plurality of struts secured to the tubular member are spaced from one another along a longitudinal axis of the tubular member.

5. The bicycle frame of claim 3, further comprising a third one and a fourth one of the plurality of struts extending between the top tube and the down tube between the head tube and the first one of the plurality of struts.

6. The bicycle frame of claim 5, wherein the plurality of struts are provided in pairs of strut members symmetrically spaced on either side of a central, longitudinal plane of the bicycle frame.

7. The bicycle frame of claim 1, wherein the plurality of struts are provided in pairs of strut members symmetrically spaced on either side of a central, longitudinal plane of the bicycle frame.

8. The bicycle frame of claim 1 incorporated into a bicycle assembly comprising a front wheel, at least one rear wheel, a handlebar, a seat and a pedal crank assembly operably coupled to drive the at least one rear wheel.

9. A bicycle frame, comprising:
   a head tube;
   a bottom bracket configured to support a pedal crank assembly;
   a down tube extending between the head tube and the bottom bracket;
   at least one chain stay extending in from the bottom bracket in a direction generally opposite the down tube;
   a single, tubular member having a first portion that forms a top tube extending downwardly from the head tube toward the bottom bracket and a unitary second portion that extends upwardly from the bottom bracket to form a seat tube;
   a plurality of struts extending between the tubular member and the down tube or at least one chain stay;
   wherein the down tube and the at least one chain stay are the only frame members that contact the bottom bracket;
   wherein a first one of the plurality of struts extends from a location on the down tube forward of the bottom bracket to a location on the tubular member vertically above or rearward of the bottom bracket;
   wherein a second one of the plurality of struts extends from the tubular member at a location on the seat tube to the at least one chain stay;
   further comprising a third one and a fourth one of the plurality of struts extending between the top tube and the down tube between the head tube and the first one of the plurality of struts;
   wherein the plurality of struts are provided in pairs of strut members symmetrically spaced on either side of a central, longitudinal plane of the bicycle frame.

10. A bicycle frame, comprising:
    a head tube;
    a bottom bracket configured to support a pedal crank assembly;
    a down tube extending between the head tube and the bottom bracket;
    at least one chain stay extending in from the bottom bracket in a direction generally opposite the down tube;
    a single, tubular member having a first portion that forms a top tube extending downwardly from the head tube toward the bottom bracket and a unitary second portion that extends upwardly from the bottom bracket to form a seat tube;
    a plurality of struts extending between the tubular member and the down tube or at least one chain stay;
    wherein the down tube and the at least one chain stay are the only frame members that contact the bottom bracket;
    wherein the plurality of struts are provided in pairs of strut members symmetrically spaced on either side of a central, longitudinal plane of the bicycle frame.

* * * * *